(12) United States Patent
Vives Jaume

(10) Patent No.: US 12,535,054 B2
(45) Date of Patent: Jan. 27, 2026

(54) METHOD OF OPERATING A WIND TURBINE

(71) Applicant: Siemens Gamesa Renewable Energy A/S, Brande (DK)

(72) Inventor: Xavier Vives Jaume, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/839,539

(22) PCT Filed: Jan. 19, 2023

(86) PCT No.: PCT/EP2023/051196
§ 371 (c)(1),
(2) Date: Aug. 19, 2024

(87) PCT Pub. No.: WO2023/160909
PCT Pub. Date: Aug. 31, 2023

(65) Prior Publication Data
US 2025/0163886 A1  May 22, 2025

(30) Foreign Application Priority Data
Feb. 25, 2022  (EP) .................................... 22158751

(51) Int. Cl.
*F03D 7/02* (2006.01)
*F03D 17/00* (2016.01)

(52) U.S. Cl.
CPC ........... *F03D 7/028* (2013.01); *F03D 17/018* (2023.08); *F05B 2270/1033* (2013.01); *F05B 2270/3032* (2013.01)

(58) Field of Classification Search
CPC ................... F03D 7/028; F03D 17/018; F05B 2270/1033; F05B 2270/3032
See application file for complete search history.

(56) References Cited

U.S. PATENT DOCUMENTS 10,408,135 B2 *  9/2019  Engler ...................... F02C 9/20
10,968,889 B2 *  4/2021  Hawkins ................. F03D 17/00
(Continued)

FOREIGN PATENT DOCUMENTS

CN    106523277 A    3/2017
EP      3690234 A1    8/2020

OTHER PUBLICATIONS

PCT International Search Report and Written Opinion of International Searching Authority mailed Mar. 24, 2023 corresponding to PCT International Application No. PCT/EP2023/051196 filed Jan. 19, 2023.

*Primary Examiner* — Tulsidas C Patel
*Assistant Examiner* — Thomas K Quigley
(74) *Attorney, Agent, or Firm* — Schmeiser, Olsen & Watts, LLP

(57) ABSTRACT

A method of operating a wind turbine is provided. The method includes steps of monitoring the temperature of a component of the wind turbine to obtain a temperature progression for that component; determining the gradient of the temperature progression; and curtailing the power output of the wind turbine on the basis of the temperature progression gradient. The disclosed further describes a wind turbine including a curtailment module configured to curtail the power output of the wind turbine on the basis of a temperature progression gradient.

15 Claims, 4 Drawing Sheets

(56) References Cited

U.S. PATENT DOCUMENTS

| | | | |
|---|---|---|---|
| 11,655,769 B2* | 5/2023 | Panov | F02C 9/28 |
| | | | 60/39.281 |
| 11,746,712 B2* | 9/2023 | Panov | F02C 9/28 |
| | | | 701/100 |
| 11,933,270 B2* | 3/2024 | Pineda Amo | F03D 17/00 |
| 2015/0322926 A1 | 11/2015 | Caponetti et al. | |
| 2019/0195198 A1* | 6/2019 | Andersen | H02P 9/006 |
| 2020/0248674 A1* | 8/2020 | Hawkins | F03D 7/044 |
| 2021/0040900 A1* | 2/2021 | Panov | F02C 9/34 |
| 2021/0071591 A1* | 3/2021 | Panov | F02C 9/28 |
| 2022/0290652 A1* | 9/2022 | Pineda Amo | F03D 17/00 |

\* cited by examiner

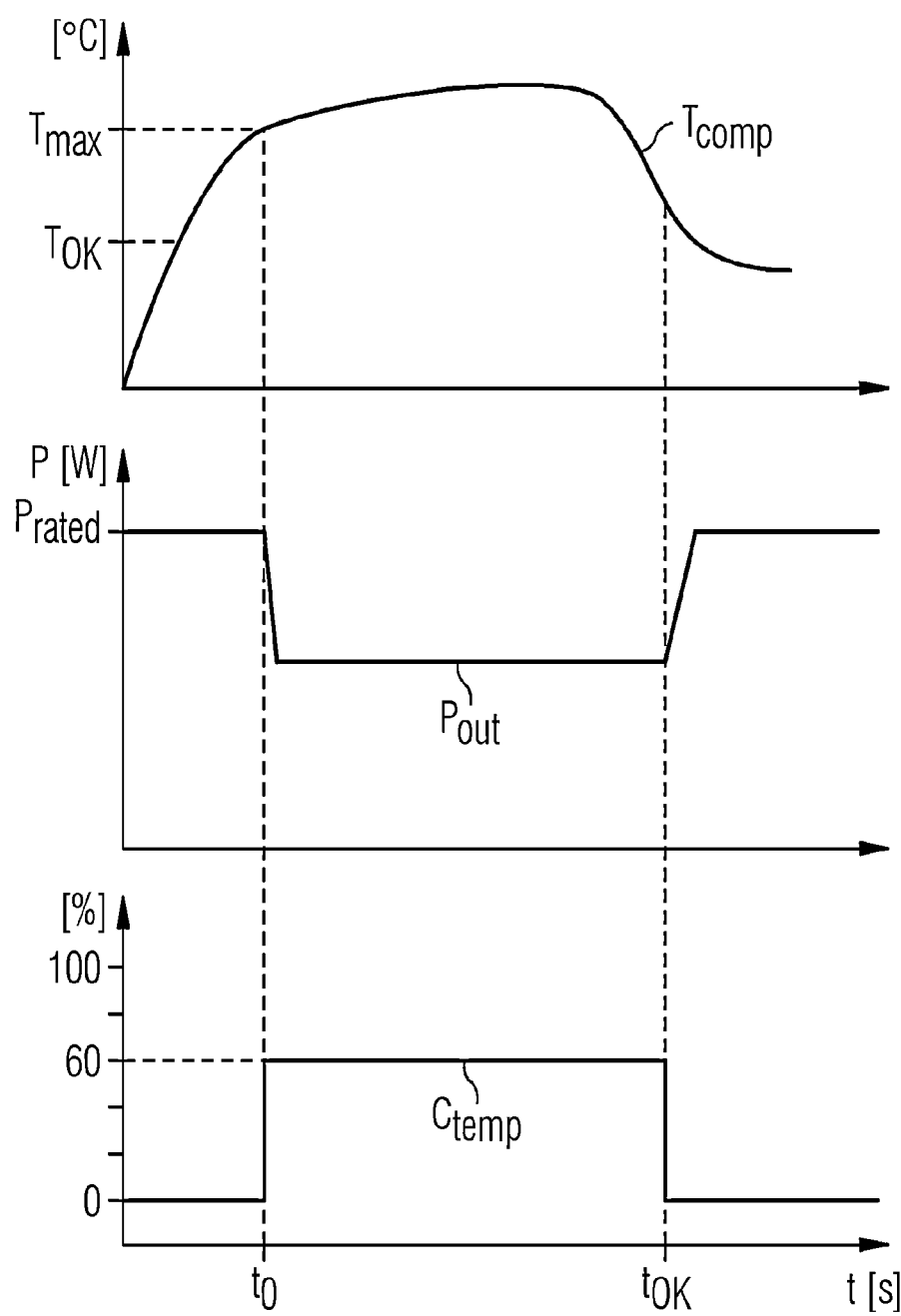

METHOD OF OPERATING A WIND TURBINE

CROSS-REFERENCE TO RELATED APPLICATIONS

This application is a national stage of PCT Application No. PCT/EP2023/051196, having a filing date of Jan. 19, 2023, claiming priority to EP application Ser. No. 22/158, 751.2, having a filing date of Feb. 25, 2022, the entire both contents of which are hereby incorporated by reference.

FIELD OF TECHNOLOGY

The following relates to a method of operating a wind turbine.

BACKGROUND

During operation of a wind turbine, certain components may become hot. For example, the generator windings may quickly become very hot, so that the generator efficiency decreases. Similarly, the oil of an oil-lubricated bearing may quickly become very hot, so that the bearing may fail. For these reasons, conventional art wind turbine control methods generally curtail the power output when such a component reaches a predetermined maximum temperature.

It is known to arrange temperature monitoring means at strategic positions and to record the temperature of one or more components. When the temperature of a component reaches a predetermined maximum, the power output of the wind turbine is curtailed by a certain amount or even stopped, until the relevant temperature has decreased to an acceptable level.

However, whenever the power output of a wind turbine is curtailed, the operator loses revenue.

SUMMARY

An aspect of embodiments of the invention provides an improved way of operating a wind turbine.

According to embodiments of the invention, the method of operating a wind turbine comprises steps of monitoring the temperature of a component of the wind turbine to obtain a temperature progression for that component; determining the gradient of the temperature progression; and curtailing the power output of the wind turbine on the basis of the temperature progression gradient. In the inventive method, the amount of curtailment is proportional to the gradient of a temperature progression. In other words, the amount of power output curtailment is increased in response to an increase in gradient of a temperature progression; or the amount of power output curtailment is decreased in response to a decrease in gradient of a temperature progression.

An aspect of the invention is based on the insight that a high temperature of a component is not necessarily an indication that the wind turbine power output needs to be curtailed. The inventors have recognized that the rate of temperature increase can be more relevant to the curtailment decision-making process. In embodiments, an aspect of the method is that the amount of curtailment can be minimized, while ensuring safe operation of the wind turbine.

According to embodiments of the invention, the wind turbine comprises a temperature monitoring arrangement configured to monitor the temperature of a component. The wind turbine further comprises a controller with a processing module that determines the temperature progression of the monitored temperature and to determine the gradient of the temperature progression. The controller further comprises a curtailment module that curtails the power output of the wind turbine on the basis of the temperature progression gradient.

An aspect of embodiments of the wind turbine is that it can operate more efficiently. The wind turbine power output will only be curtailed by an amount indicated by the gradient of a temperature progression. In other words, a component is allowed to reach a high temperature (assuming the high temperature is not detrimental to the component), and the power output of the wind turbine is only curtailed if the rate of increase of that temperature is considered undesirably fast. It follows that the power output of the wind turbine is not curtailed if the rate of increase of that temperature is considered sufficiently slow.

An aspect of embodiments of the invention is also achieved by a computer program product (non-transitory computer readable storage medium having instructions, which when executed by a processor, perform actions) with a computer program that is directly loadable into the memory of a wind turbine controller, and which comprises program units to perform the steps of the inventive method when the program is executed by the wind turbine controller.

The inventive method can be applied in any type of wind energy plant, for example a stand-alone wind turbine, a wind turbine of an offshore wind farm, etc. It shall be assumed that the wind turbine is a variable-speed wind turbine whose power output can be adjusted by issuing appropriate references. The wind turbine may be assumed to comprise several "temperature-relevant" components such as a gearbox, a generator, a bearing, a converter, a transformer, a heat exchanger, etc. The expression "temperature-relevant component" shall be understood as a component with one or more regions that become hot during operation, and which are usually monitored to ensure fault-free operation.

A temperature in a temperature-relevant component can be monitored essentially continuously, if desired. Alternatively, a temperature can be measured at regular intervals, for example every 10 seconds, every 30 seconds, etc., and the temperature progression can be a series of discrete measurements. The shape of the temperature progression can be determined using any suitable technique of interpolation, extrapolation, etc. In this way, the processing module can identify for example whether a monitored temperature is increasing, decreasing or remaining essentially constant. Using any suitable technique of slope calculation, the processing module can infer the gradient of a temperature progression. The gradient is a signed number that quantifies the rate of increase/decrease of the corresponding temperature progression. A large positive value indicates a sharp increase in temperature; a negative number indicates a decrease in temperature; a value of zero indicates a flat or unchanging temperature.

In an embodiment of the invention, the amount of curtailment is determined on the basis of the amount by which the gradient differs from the threshold gradient. For example, a 3-in-1 gradient (the temperature progression has a slope of 3) might result in curtailment of 30%, whereas a 2-in-1 gradient (the temperature progression has a slope of 2) might result in curtailment of 15%.

For each temperature-relevant component of the wind turbine, a threshold gradient can be identified, for example from empirical data. In an embodiment of the invention, the threshold gradient of a component temperature can be updated during the component's lifetime, so that an overall decline in performance is not further exacerbated by excessive temperature swings.

In a further embodiment of the invention, power output curtailment is ended when the gradient of a temperature progression has decreased to the level of a predetermined threshold. For example, a gradient of less than 0.5 may be considered acceptable, i.e., the monitored temperature appears to be stable and does not necessitate continued power output curtailment.

In a further embodiment of the invention, as soon as the gradient reaches a value of zero or changes sign (becomes negative), power output curtailment is ended.

In an exemplary situation, the wind turbine may be controlled to operate at its rated level, i.e., to generate its rated power output. The temperature in a temperature-relevant component such as a gearbox may exhibit a sharp increase. In a conventional art control method, this abrupt temperature increase would be detected, and the power output would be severely curtailed until the temperature in the gearbox returns to an acceptable level. Until such time, the power output curtailment is accompanied by loss in revenue.

In contrast, the inventive approach observes the temperature progression of a temperature-relevant component, and only curtails the power output if the gradient of the temperature progression exceeds a threshold gradient. Furthermore, the power output is only curtailed by an amount necessary to lower the gradient of that temperature progression. In other words, the temperature of the component may be allowed to increase further, but at an acceptable rate.

Each of a plurality of temperature-relevant components may be monitored for one or more temperatures, for example a particularly temperature-relevant component may be provided with two or more temperature sensors placed at strategic locations. Temperature progressions are obtained for all such components, and a gradient is determined for each temperature progression.

The monitored temperatures are not necessarily equally relevant, for example the temperature of an oil lubricant in a gearbox may be considered more relevant than the temperature in a cooling unit. A "long-term ranking" of temperature relevancies may be adjusted according to the component lifetimes. A "short-term ranking" of temperature relevancies may be adjusted according to the wind turbine power output, and/or on the basis of component fatigue information collected by the wind turbine controller. For example, if it is known that a temperature-relevant component may be likely to fail owing to accumulated fatigue, its threshold gradient may be reduced so that its temperature is only allowed to increase at a more sedate rate in an effort to prolong its lifetime. The power output curtailment is done on the basis of the most relevant or "highest ranking" temperature gradient.

In a further embodiment of the invention, the ambient temperature is also monitored for each relevant component. Here, the ambient temperature of a component shall be understood as the temperature of the air about that component. This embodiment is based on the insight that the ambient temperature can significantly affect the temperature of a component during operation, since the capacity of the component to dissipate heat is determined by the differential between component temperature and ambient temperature. To this end, one or more components can be equipped with an ambient temperature sensing means. Each ambient temperature can be used by the controller in its assessment of whether curtailment is necessary to curb the temperature increase of the corresponding component. For example, a steep temperature progression gradient in combination with a low ambient temperature would imply that, in spite of being surrounded by cooling air, the temperature of a component is increasing at an unfavorably fast rate, which would indicate the need for curtailment in order to bring down the temperature of that component.

In a further example, a steep temperature progression gradient in combination with a high ambient temperature would indicate the need for more severe curtailment to lower the temperature of that component. In a further example, a mild temperature progression gradient in combination with a low ambient temperature can be interpreted to mean that curtailment is not necessarily required, since the low ambient temperature is sufficient to keep the temperature of that component within safe limits. The curtailment module of the controller can then generate power references accordingly.

Other aspects and features of the present invention will become apparent from the following detailed descriptions considered in conjunction with the accompanying drawings. It is to be understood, however, that the drawings are designed solely for the purposes of illustration and not as a definition of the limits of embodiments of the invention.

BRIEF DESCRIPTION

Some embodiments will be described in detail, with references to the following Figures, wherein like designations denote like members, wherein:

FIG. 4 shows exemplary curves to illustrate a conventional art method.

DETAILED DESCRIPTION

Figure 1:
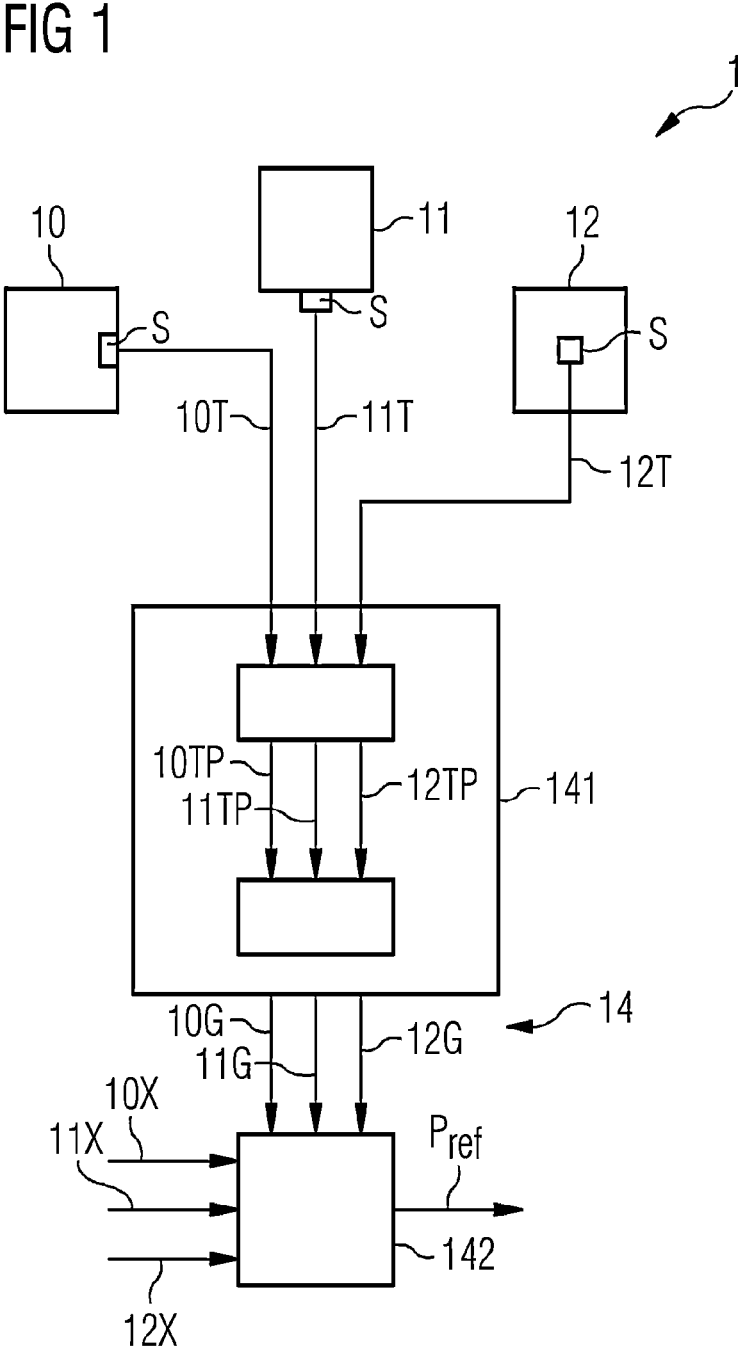
FIG. 1 is a block diagram of an embodiment of the wind turbine.

FIG. 1 is a simplified block diagram representing an embodiment of the inventive wind turbine 1. The diagram indicates a number of components 10, 11, 12 that have temperature critical regions, and also a temperature monitoring arrangement with an exemplary arrangement of temperature sensors S placed to measure critical temperature(s). Here, a temperature sensor S is placed to monitor a temperature of the generator windings in the generator 10, a temperature sensor S is placed to monitor the oil temperature of a gearbox lubrication system 11, and a temperature sensor S is placed to monitor the temperature in a converter unit 12. Each temperature sensor can report a temperature reading 10T, 11T, 12T at favorably brief intervals, for example once per minute, once every 30 seconds, etc.

The diagram indicates a wind turbine controller 14 (this can be realized locally to the wind turbine, or at a remote location for example in the case of a wind farm), which receives temperature readings 10T, 11T, 12T from the various temperature sensors S. The controller 14 includes a processing module 141 configured to determine the gradient 10G, 11G, 12G of each monitored temperature 10T, 11T, 12T. This can be done by applying a suitable algorithm that derives the gradient of the temperature progression recorded in the temperature readings. The controller 14 further includes a curtailment module 142 that can generate an appropriate power reference $P_{ref}$ depending on the behavior of the temperature progressions. To this end, the controller 14 receives a threshold rate of increase 10X, 11X, 12X for each of the monitored components 10, 11, 12.

Figure 2:
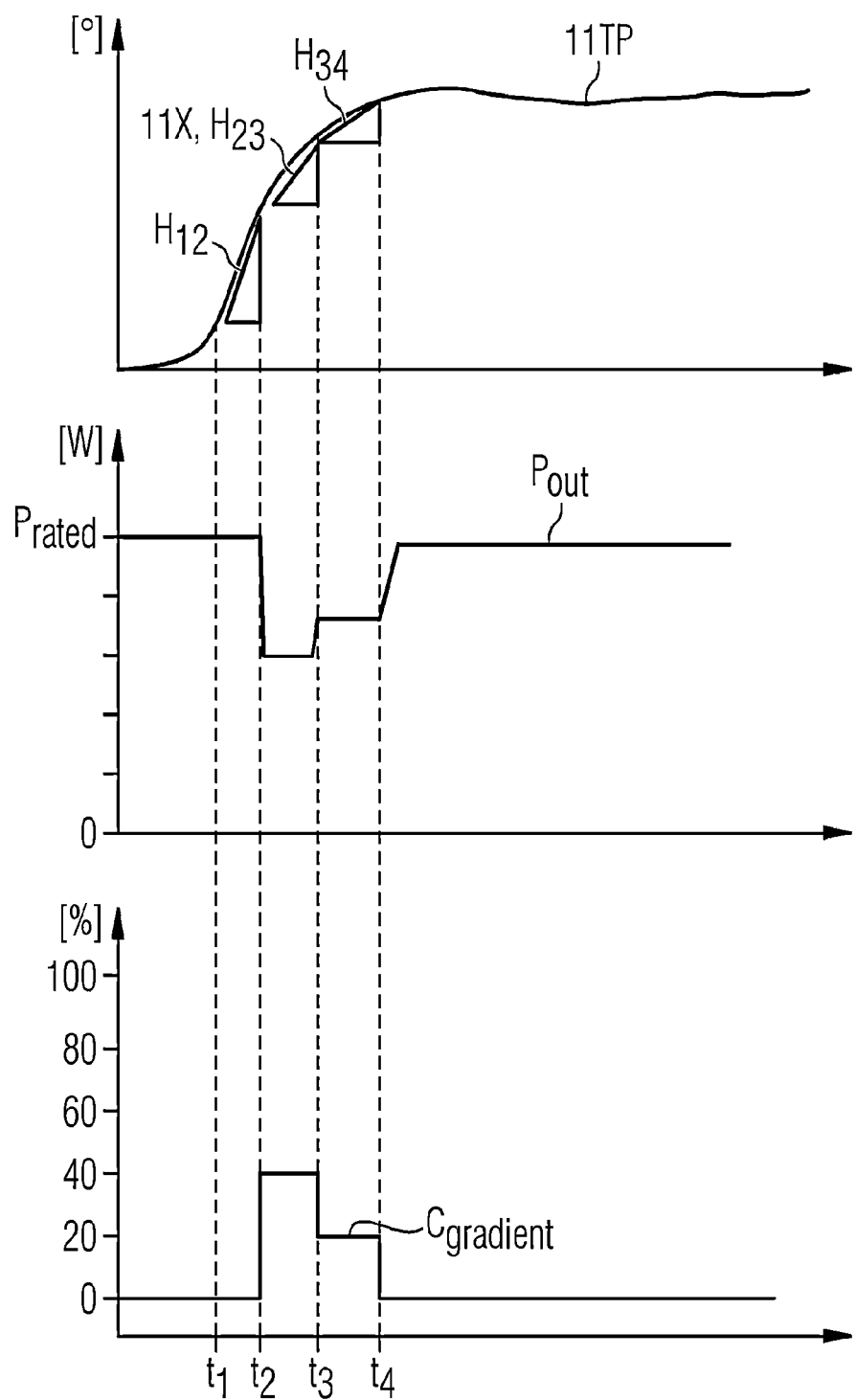
FIG. 2 shows exemplary curves to illustrate an embodiment.

FIG. 2 illustrates the outcome of a sharply rising temperature as reported for example by the temperature sensor of the gearbox lubrication system 11. At the top, the diagram shows a graph of temperature 11T against time (X-axis). The power output $P_{out}$ of the wind turbine is shown in the center of the diagram. The lower part of the diagram represents gradient-based curtailment $C_{gradient}$, where 0% curtailment corresponds to maximum power output (under the momentary wind conditions), and 100% curtailment essentially corresponds to shutdown.

Between time $t_1$ and time $t_2$, the oil temperature 11T exhibits a steep increase. The temperature gradient over a time period (e.g., between time t1 and time t2) can be estimated from the temperature progression 11TP as the slope of the line—the hypotenuse of the inferred triangle—connecting a first coordinate pair (at time t1) and a second coordinate pair (at time t2). The processing module determines that the rate of increase as indicated by hypotenuse $H_{12}$ exceeds the threshold rate of increase 11X for that component 11. In response to this steep increase, the curtailment module 142 issues a power reference to curtail the power output $P_{out}$, in this case curtailment by 40% of the rated power output $P_{rated}$ as indicated from time $t_2$ onwards.

Between time $t_2$ and time $t_3$, the oil temperature 11T is still increasing, in this case at a rate that corresponds to the threshold rate of increase 11X for that component 11, as indicated by hypotenuse $H_{23}$. The curtailment module 142 responds by issuing a power reference to curtail the power output $P_{out}$ to a less severe degree, in this case curtailment by 20% of the rated power output $P_{rated}$. This is indicated from time $t_3$ onwards.

The temperature of the gearbox lubricant continues to increase between time $t_3$ and time $t_4$, but at a significantly lower rate indicated by hypotenuse $H_{34}$, i.e., at a rate that is less than the critical gradient 11X. The newly computed gradient may therefore be regarded as insignificant, and the actual temperature 11T may be regarded as acceptable for that component. In response, the curtailment module 142 ceases curtailment at time $t_4$ onwards.

As illustrated in the diagram, the amount of curtailment is determined based on the amount by which the gradient $H_{12}$, $H_{23}$, $H_{34}$ differs from the threshold gradient 11X. With this gradient-focused control approach, the amount of curtailment is kept to a favorable minimum, and only a relatively small amount of revenue is sacrificed as indicated by the brief "dip" in output power $P_{out}$.

The discrete nature of this exemplary control approach is exaggerated in the diagram. The intervals between temperature measurements can be small, i.e., the sampling rate can be high. The processing module 141 can continually update a gradient computation with each new temperature sample. In this way, the curtailment curve $C_{gradient}$ can be updated at a rate similar to the sampling rate.

Of course, the temperatures in the various components increase and decrease essentially independently of each other. The controller 14 is configured to curtail the power output on the basis of the most relevant monitored temperature. To this end, the processing module can determine the most relevant temperature behavior. For example, an increase in temperature in a first component 10 may be considered more relevant than an increase in temperature in a second component 11 if the gradient 10G of temperature progression for the first component 10 exceeds its threshold gradient 10X, even if the measured temperature 11T of the second component 11 might be considered "more critical" than the measured temperature 10T of the first component 10. The considered curtailment in response to the temperature gradient 10G of the first component will in any case have a beneficial effect on the temperature of the second component 11, since the temporary and relatively minor curtailment (until the gradient 10G has decreased to below its threshold 10X) can allow the temperature of the second component 11 to decrease also.

In an alternative approach to resuming uncurtailed operation, the wind turbine controller may apply an incremental approach to ramp the output power back up towards the higher output level $P_{rated}$.

Figure 3:
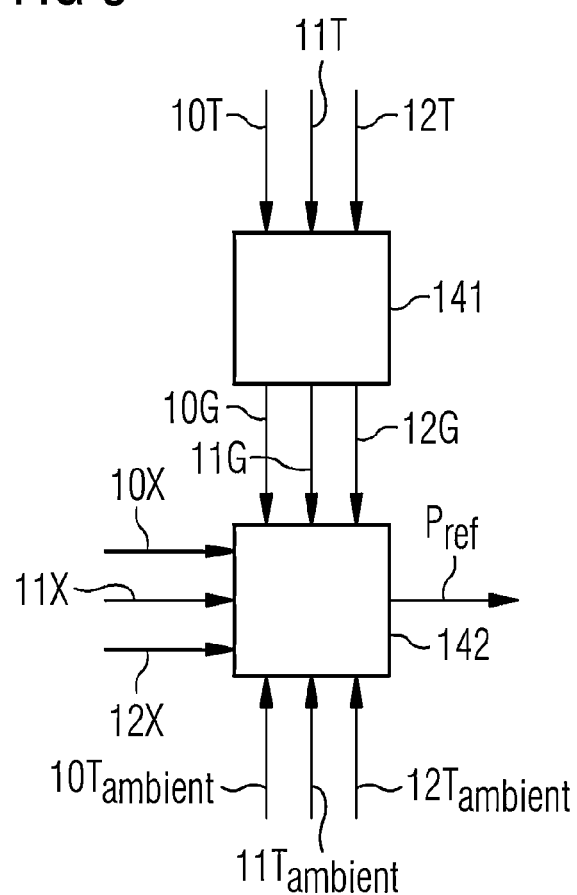
FIG. 3 is a block diagram representing a further embodiment.

FIG. 3 is a simplified block diagram representing a further embodiment of the invention, based on the embodiment of FIG. 1. Here also, temperature readings 10T, 11T, 12T are reported for the components 10, 11, 12, and the processing module 141 of the wind turbine controller 14 determines the gradient 10G, 11G, 12G of each monitored temperature 10T, 11T, 12T.

In this embodiment, the curtailment module 142 also receives an ambient temperature reading $10T_{ambient}$, $11T_{ambient}$, $12T_{ambient}$ for each component 10, 11, 12. The curtailment module 142 is configured to assess each gradient 10G, 11G, 12G in view of the corresponding ambient temperature reading $10T_{ambient}$, $11T_{ambient}$, $12T_{ambient}$. For example, for a specific component, a steep gradient in combination with a low ambient temperature would indicate the need for more severe curtailment in order to bring down the temperature of that component. Similarly, a mild gradient in combination with a low ambient temperature would indicate that curtailment is not necessarily required, since the low ambient temperature may be enough to keep the temperature of that component within safe limits. The curtailment module 142 can then generate an appropriate power reference $P_{ref}$ on the basis of the received information 10G, 11G, 12G, 10X, 11X, 12X, $10T_{ambient}$, $11T_{ambient}$, $12T_{ambient}$.

FIG. 4 shows a conventional art approach to power output curtailment in response to temperature. The diagram shows the temperature progression $T_{comp}$ of a wind turbine component. The wind turbine is generating its rated power output $P_{rated}$. When the temperature exceeds a certain upper threshold $T_{max}$ at time $t_0$, the wind turbine output power $P_{out}$ is curtailed as shown here, by 40% of the rated power output $P_{rated}$. This state of reduced power output is maintained until the temperature decreases to a predetermined acceptable level $T_{OK}$ at time $t_{OK}$, at which point the power output can be increased again. However, by simply waiting for the temperature to decrease to a pre-determined level, even though safe operation at a higher temperature is possible, significant revenue may be sacrificed.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine, comprising:
   monitoring a temperature of a component of the wind turbine to obtain a temperature progression for the component;
   monitoring an ambient temperature for the component;
   determining a gradient of the temperature progression; and curtailing a power output of the wind turbine on the basis of the gradient of the temperature progression, wherein an amount of curtailment is proportional to the gradient of the temperature progression; and wherein the amount of curtailment is also based on the ambient temperature for the component.

2. The method according to claim 1, wherein curtailment is increased in response to an increase in the gradient of the temperature progression.

3. The method according to claim 1, wherein curtailment is decreased in response to a decrease in the gradient of the temperature progression.

4. The method according to claim 1, comprising: concluding the curtailment when the gradient of the temperature progression is less than a predetermined threshold gradient.

5. The method according to claim 1, wherein a threshold gradient is determined on the basis of empirical data.

6. The method according to claim 1, wherein a temperature progression is obtained for each of a plurality of components, and wherein a gradient is determined for each temperature progression.

7. The method according to claim 6, comprising: ranking the components according to temperature relevance, and wherein the power output of the wind turbine is curtailed on the basis of the temperature progression of the highest ranking component.

8. A wind turbine comprising:
a temperature monitoring arrangement configured to monitor a temperature of a component of the wind turbine;
an ambient temperature sensor configured to monitor an ambient temperature for the component; and
a controller including
a processing module configured to determine a temperature progression of the monitored temperature and to determine a gradient of the temperature progression; and
a curtailment module configured to curtail a power output of the wind turbine on the basis of the gradient of the temperature progression, wherein an amount of curtailment is proportional to the gradient of the temperature progression, and wherein the amount of curtailment is also based on the ambient temperature for the component.

9. The wind turbine according to claim 8, wherein the temperature monitoring arrangement comprises at least one temperature sensor arranged in proximity to a region of thermal significance of h component.

10. The wind turbine according to claim 8, wherein, for each of a plurality of temperature progressions, the controller is configured to compare a respective gradient to a threshold gradient.

11. The wind turbine according to claim 8, wherein the temperature monitoring arrangement monitors a winding temperature of a generator.

12. The wind turbine according to claim 8, wherein the temperature monitoring arrangement monitors an oil temperature of a bearing lubrication system.

13. The wind turbine according to claim 8, wherein the temperature monitoring arrangement monitors a temperature in a converter unit.

14. A computer program product comprising a computer readable hardware storage device having computer readable program code stored therein, said program code executable by a processor of a computer system to implement the method according to claim 1 when the computer program is executed by the processor.

15. The wind turbine according to claim 8, wherein the processing module is configured to determine a plurality of temperature progressions and to determine a plurality of respective gradients of the respective temperature progressions, and wherein the curtailment module is configured to assess each of the respective gradients of the respective temperature progressions in view of a corresponding ambient temperature.

* * * * *